United States Patent Office 3,367,446
Patented Feb. 6, 1968

3,367,446
MOTOR VEHICLE INCORPORATING AN
IMPROVED LUBRICATION SYSTEM
James H. Higgins, % Higgs Electrical & Mechanical
Engineers Limited, 15–17 Kent Road, Glasgow C.3,
Scotland
Filed Oct. 5, 1964, Ser. No. 401,606
Claims priority, application Great Britain, Oct. 5, 1963,
39,298/63
1 Claim. (Cl. 184—7)

This invention is concerned with a motor vehicle incorporating an improved lubrication system and has for its primary object the provision in a motor vehicle of such a system which is incorporated in the vehicle in a simple manner and without expensive adaptation of the vehicle.

In a motor vehicle according to the invention the lubrication system incorporates a pump which is operatively driven by an electric motor and which serves to supply lubricating oil, from a reservoir thereof, to at least some of the lubrication points of the vehicle by way of a plurality of interconnecting pipes, said electric motor being actuated when one or more of the auxiliaries associated with the vehicle is operated.

The term "auxiliaries" as herein used is to be understood to denote these units which are operated only intermittently while the vehicle is in use and includes such units as the starter motor, the horn, and the direction indicators, but does not include the engine which serves to propel the vehicle.

Figure 1:
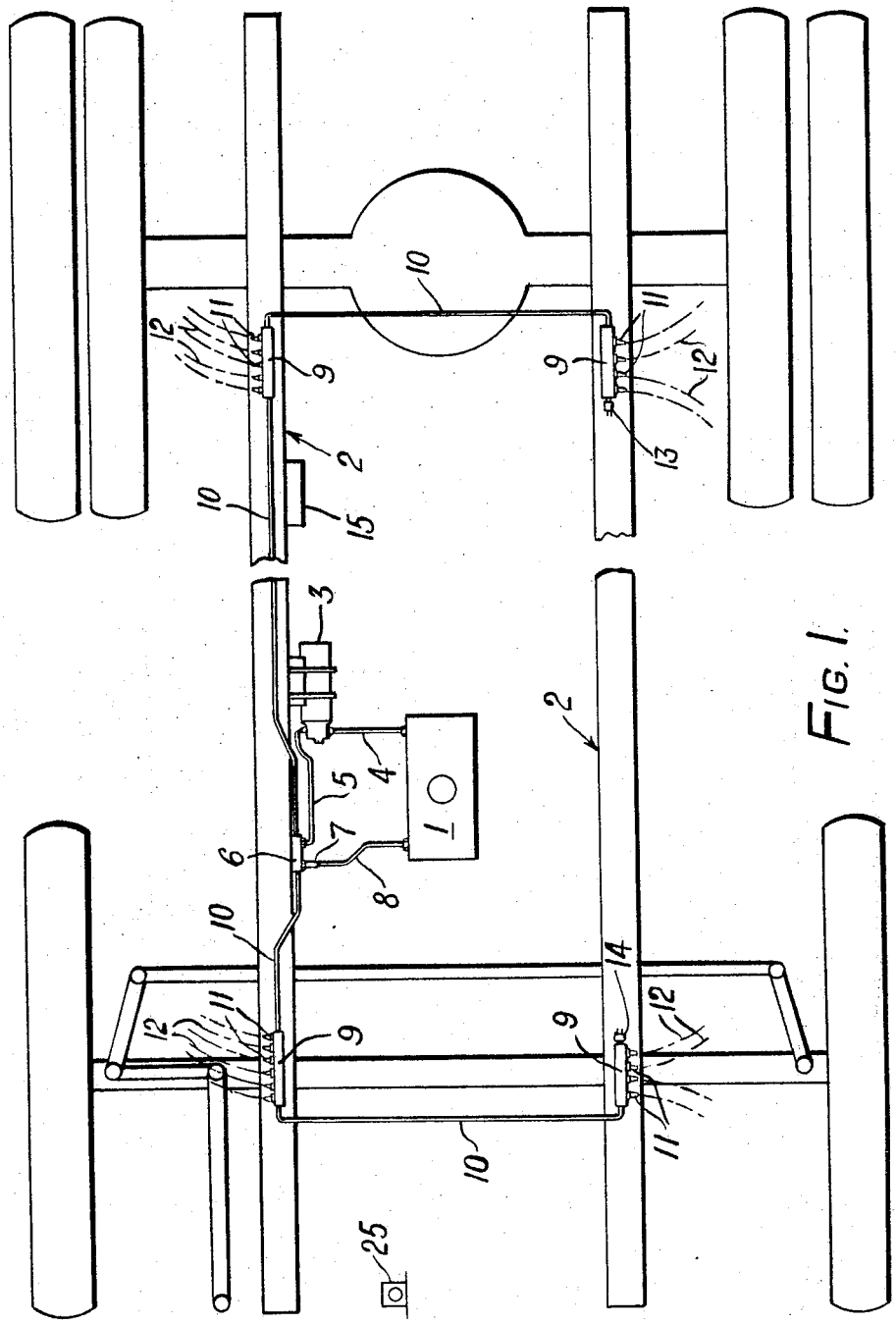
Figure 2:
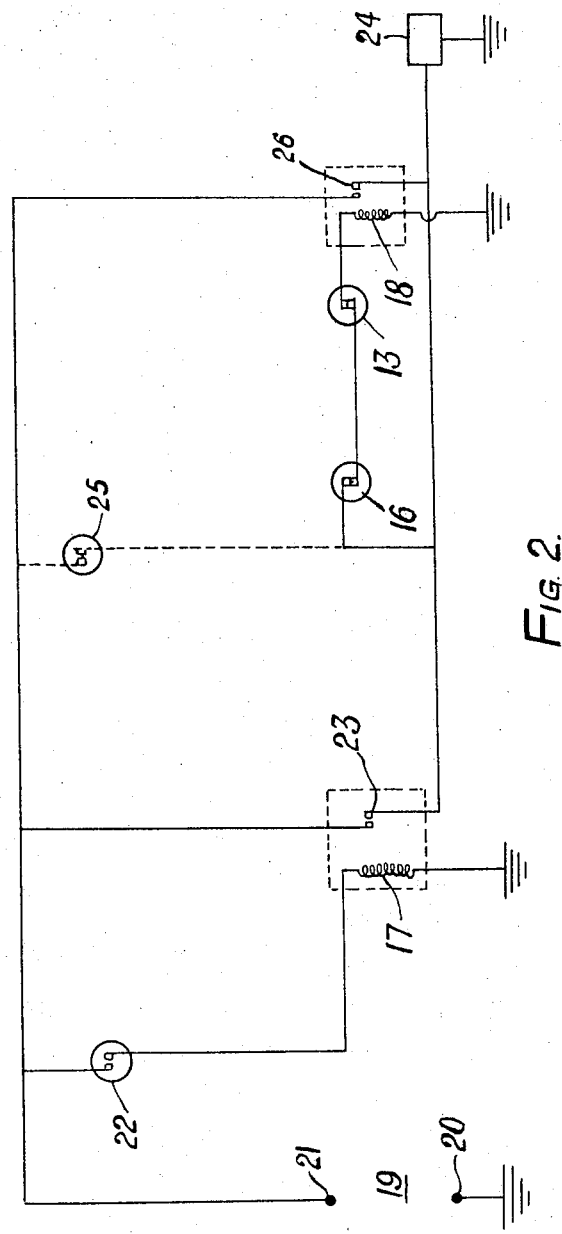

In order that the invention may be more clearly understood and more readily carried into effect the same will now be described more fully with reference to the accompanying drawings in which FIG. 1 is a diagrammatic view of the underside of the chassis of a heavy commercial motor vehicle, according to the invention, in which is incorporated one embodiment of lubrication system, and FIG. 2 is a diagram of the electrical circuit of the lubrication system illustrated in FIG. 1.

The present invention is particularly applicable to heavy commercial vehicles which include tractor mechanical handling units driven electrically or by internal combustion engines, bulldozers and the like, and diesel and electric railway engines.

Referring to FIG. 1 of the drawings, 1 denotes a reservoir of lubricating oil consisting of a tank mounted on the chassis of the vehicle, the chassis being denoted generally by the reference 2.

Also mounted on the chassis 2 is a pump unit 3 which incorporates a pump of the rotary gear type, the pump being operatively driven by an electric motor which is of the series wound type and which is also incorporated in the pump unit 3.

The tank 1 is connected by a supply line 4 to the suction of the pump incorporated in the pump unit 3 and the delivery of said pump is connected by a further supply line 5 to a main distributor block 6 mounted on the chassis 2 of the vehicle, the block 6 also being connected to the tank 1 through a pressure relief valve 7 and a return line 8. The lines 4, 5 and 8 may be formed of wrapped steel piping of 8 mm. diameter having a bursting pressure of 4000 p.s.i.

Four auxiliary distributor blocks 9 which are mounted on the chassis 2 are mounted in main feed lines 10 which are connected to the distributor block 6 and which may be formed of wrapped steel piping of 6 mm. diameter having a bursting pressure of 4000 p.s.i. Each of the distributor blocks 9 is connected through a plurality of metering valves 11 and auxiliary feed lines 12 to the chassis lubrication points on the vehicle. The metering valves 11 serve to reduce the pressure of the lubricating oil to the value required at the chassis lubrication points. For clarity the lines 12, which may be formed of steel or nylon piping of 4 mm. diameter having a bursting pressure of 2000 lbs./sq. in., are only partially illustrated and are shown as chain dotted lines.

A cut-off pressure switch 13 is mounted in communication with the end of one of the lines 10 remote from the block 6, the switch 13 being actuated when the pressure acting thereon attains a pre-determined value, and an indicator pressure switch 14 is mounted in communication with the end of the other of the lines 10 remote from the block 6, the switch 14 being actuated to cause a sensory indicator such as a warning light or buzzer located in the driver's compartment of the vehicle to operate on completion of the lubrication of the lubrication points thereby indicating to the driver that the desired lubrication has been effected. The function of the cut-off pressure switch 13 is hereinafter described more fully with reference to FIG. 2 of the drawings.

A control box 15 is mounted on the chassis 2 of the vehicle, the control box 15 containing a thermal overload cut-out 16 (FIG. 2) and two solenoids 17, 18 (FIG. 2) the functions of which are hereinafter described more fully with reference to FIG. 2.

The pump unit 3 and the control box 15 while they may be mounted on the chassis 2 at any convenient position are preferably positioned within the recess presented by one of the longitudinally extending channel members constituting a part of the chassis 2 of the vehicle.

With reference to FIG. 2 of the drawings, in which, for clarity, the indicator pressure switch 14 and the associated electrical connections are omitted, 19 denotes a power supply, one terminal 20 of which is grounded and the other terminal 21 of which is electrically connected through a normally open starting button 22 and the solenoid 17 to ground. A normally open switch 23 which is operated by the solenoid 17 is electrically connected between the terminal 21 of the power supply 19 and an electric motor 24 which is the electric motor incorporated in the pump unit 3.

The thermal overload cut-out 16 and the cut-off pressure switch 13 are electrically connected in series with the solenoid 18 between the electric motor 24 and earth.

A manually operable starting button 25, which is conveniently positioned within the driver's compartment of the vehicle, and a normally open switch 26 which is operated by the solenoid 18 are electrically connected in parallel between the terminal 21 of the power supply 19 and the electric motor 24.

The electric circuit is preferably as described above with reference to FIG. 2 so that there is no risk of the auxiliary or auxiliaries associated with the vehicle and which, when operated, causes or cause actuation of the electric motor 24, as is hereinafter described, being unintentionally operated when the manually operable button 25 is closed but, if desired, the solenoid 18 may be constituted by the solenoid 17 with the manually operable button 25 electrically connected in parallel with the starting button 22 and with the thermal overload cut-out 16 and the cut-off pressure switch 13 electrically connected in series in the circuit to the electric motor 24.

When the or one of the appropriate auxiliaries, such as the engine starter motor, of the vehicle is operated the starting button 22 is momentarily closed thereby. The solenoid 17 is thus energised causing the switch 23 to close. Closure of the switch 23 causes the electric motor 24 to be operated and also causes current to flow through the parallel circuit in which the thermal overload cut-out 16, the cut-off pressure switch 13 and the solenoid 18 are electrically connected in series. Energisation of the solenoid 18 causes the switch 26 to close so that when the starting button 22 opens thereby de-energising the solenoid 17 and allowing the switch 23 to return to the open condition the electric motor 24 continues to operate through the switch 26, the solenoid 18 being maintained in the energised condition by current flowing through the parallel circuit in which the thermal overload cut-out 16 and the cut-off pressure switch 13 are electrically connected in series.

Operation of the electric motor 24 causes lubricating oil to be drawn from the tank 1 through the supply line 4 and to be supplied through the further supply line 5 to the main distributor block 6 from which the oil flows through the main feed lines 10 to the auxiliary distributor blocks 9 and hence through the metering valves 11 and the auxiliary feed lines 12 to the chassis lubrication points of the vehicle. Should a blockage occur the pressure relief valve 7 opens on account of the resultant increase in pressure acting thereon thus permitting the lubricating oil to return through the line 8 to the tank 1.

The cut-off pressure switch 13 is set to open when the pressure increases on completion of the lubrication of the lubrication points. The switch 13, which is of the automatically re-setting type, may, for example, be arranged to open when the pressure acting thereon attains a value of 400 p.s.i.

When, therefore, on completion of the lubrication of the lubrication points the cut-off pressure switch 13 opens the circuit to the solenoid 18 is thereby broken so allowing the switch 26 to return to the open condition. Operation of the electric motor thus ceases.

Should damage be caused to the main feed lines 10 or should there be a failure of the pressure relief switch 13 an increase in the current flow to the electric motor 24 and in the current flow through the parallel circuit in which the thermal overload cut-out 16, the cut-off pressure switch 13 and the solenoid 18 are electrically connected in series results. If this increase in current flow to the electric motor 24 is such that damage could thereby be caused to the electric motor 24 the thermal overload cut-out 16 opens, say after a time delay of, for example, 30 seconds, so that the switch 26 is again returned to the open condition thus causing operation of the electric motor 24 to cease.

The manually operable button 25 is intended to be actuated, as required, to cause operation of electric motor 24 when the auxiliary or auxiliaries associated with the vehicle and which, when actuated, cause operation of the electric motor 24, as is hereinbefore described, is or are insufficiently used to ensure adequate lubrication. For example, if said auxiliary is constituted by the engine starter motor of the vehicle it may be necessary periodically to lubricate the chassis lubrication points, by actuation of the button 25, during the course of a long continuous journey.

When the button 25 is closed the electric motor 24 is operated by current flowing through the button 25, current also being caused thereby to flow through the parallel circuit in which the thermal overload cut-out 16, the cut-off pressure switch 13 and the solenoid 18 are electrically connected in series. Energisation of the solenoid 18 causes the switch 26 to close so that when the button 25 is released and returns to the open condition the electric motor 24 continues to operate since current is supplied through the switch 26, the solenoid 18 being maintained in the energised condition by current flowing through said parallel circuit in which the solenoid 18 is connected. The functioning of the cut-off pressure switch 13 and of the thermal overload cut-out 16 to cause operation of the electric motor 24 are as hereinbefore described.

It is an advantage of the present invention that a lubricating oil can be used which is of higher viscosity, as is frequently desirable, than the lubricating oils hitherto used in the lubrication of the chassis lubrication points of motor vehicles.

A further advantage of the present invention is that, provided a body of lubricating oil is maintained within the tank 1, the chassis lubrication points of the vehicle which are served by the system require no additional lubrication maintenance.

What is claimed is:

1. A motor vehicle having lubrication points and auxiliaries and a lubrication system comprising a pump and an electric motor connected to said pump and capable of driving said pump continuously, a reservoir for lubricating oil, and a plurality of interconnecting pipes interconnecting said reservoir by way of said pump with at least some of said lubricating points, a source of electrical power, a first electrical circuit between said electrical source and ground, a normally open starting switch in said first electrical circuit closable when at least one of said auxiliary units is operated, and a first solenoid electrically connected in series with said starting switch and operable upon the closing of said starting switch for closing a second circuit parallel to said first circuit for transmitting electrical energy to said electrical motor for continuously operating said motor, said second circuit including a first normally open switch controlled by the first solenoid and connected in series with said electric motor, a second solenoid electrically connected in parallel with said electric motor and in series with a cut-off pressure switch arranged to open when the pressure in the lubrication system exceeds a predetermined value and with a thermal overload cut-out switch arranged to open when the value of the electric current flowing therethrough to the motor exceeds a predetermined value, and a second normally open switch electrically connected in parallel with said first normally open switch, actuation of which latter switch is controlled by said second solenoid.

References Cited
UNITED STATES PATENTS

| | | | |
|---|---|---|---|
| 1,387,248 | 8/1921 | Fackler | 184—6 |
| 1,582,853 | 4/1926 | Newmeyer | 184—6 |
| 1,896,852 | 2/1933 | Schaer | 123—196 |
| 1,961,514 | 6/1934 | Ernst et al. | 184—6 |
| 2,337,838 | 12/1943 | Reavis | 123—196 X |
| 2,502,318 | 3/1940 | Fischer | 184—6 |
| 2,952,782 | 9/1960 | Woyden | 290—37 |
| 2,975,296 | 3/1961 | Domingvez-Rego | 290—37 |
| 3,130,318 | 4/1964 | Curtis | 290—38 |

LAVERNE D. GEIGER, *Primary Examiner.*

H. S. BELL, *Assistant Examiner.*